(12) United States Patent
Barneron et al.

(10) Patent No.: US 9,900,419 B2
(45) Date of Patent: Feb. 20, 2018

(54) FLAP FOR PAYMENT DEVICE COMPRISING A PAYMENT TERMINAL AND A HOUSING FOR HOLDING A COMMUNICATION TERMINAL

(71) Applicant: Ingenico Group, Paris (FR)

(72) Inventors: Sylvain Barneron, Bourg-les-Valence (FR); Marion Froment, Loriol (FR); Philippe Dedieu, Guilherand-Granges (FR)

(73) Assignee: INGENICO GROUP, Paris (FR)

( * ) Notice: Subject to any disclaimer, the term of this patent is extended or adjusted under 35 U.S.C. 154(b) by 0 days.

(21) Appl. No.: 14/955,873

(22) Filed: Dec. 1, 2015

(65) Prior Publication Data

US 2016/0156763 A1    Jun. 2, 2016

(30) Foreign Application Priority Data

Dec. 1, 2014    (FR) .................................... 14 61744

(51) Int. Cl.
*G07F 19/00* (2006.01)
*H04M 1/725* (2006.01)
*G06Q 20/32* (2012.01)
*G06F 1/16* (2006.01)
*G07F 7/08* (2006.01)

(52) U.S. Cl.
CPC ...... *H04M 1/72527* (2013.01); *G06F 1/1632* (2013.01); *G06Q 20/32* (2013.01); *G06Q 20/322* (2013.01); *G07F 7/088* (2013.01)

(58) Field of Classification Search
CPC ... G07F 19/20; G07F 7/1008; G06Q 20/1085; G06Q 20/341; G06K 7/10881; G06K 7/10851; G06K 17/0022; G06K 7/10772

USPC ........ 235/379, 380, 462.45, 472.01, 472.02, 235/472.03
See application file for complete search history.

(56) References Cited

U.S. PATENT DOCUMENTS 8,856,033 B2 * 10/2014 Hicks .................. G07G 1/0081
235/385
2004/0058705 A1    3/2004 Morgan et al.
2013/0021164 A1    1/2013 Heaton
2013/0128449 A1    5/2013 Chen
(Continued)

FOREIGN PATENT DOCUMENTS

EP    1225501 A2    7/2002
EP    1732291 A1    12/2006
(Continued)

OTHER PUBLICATIONS

French Search Report and Written Opinion dated Jul. 17, 2015, from corresponding French Application No. 1461744, filed Dec. 1, 2014.

*Primary Examiner* — Karl D Frech
(74) *Attorney, Agent, or Firm* — David D. Brush; Westman, Champlin & Koehler, P.A.

(57) ABSTRACT

A payment device includes a payment terminal, a housing for holding a communication terminal, and a flap. The flap includes: a framework for blocking access to the housing for holding a communication terminal, and a locking device including at least an actuating part and a locking part. The actuating part and the locking part are respectively movable with respect to the frame between a locking position and an unlocking position.

10 Claims, 3 Drawing Sheets

(56) References Cited

U.S. PATENT DOCUMENTS

2013/0262299 A1 10/2013 Lacroix et al.
2014/0347815 A1 11/2014 Yamazaki

FOREIGN PATENT DOCUMENTS

WO 2010024923 A1 3/2010
WO 2014058620 A1 4/2014

* cited by examiner

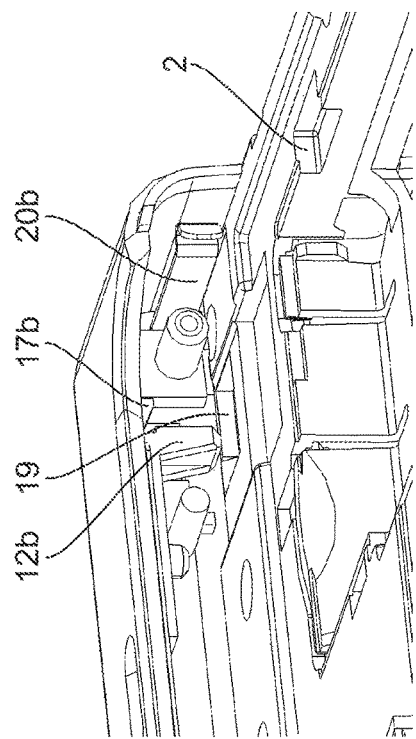
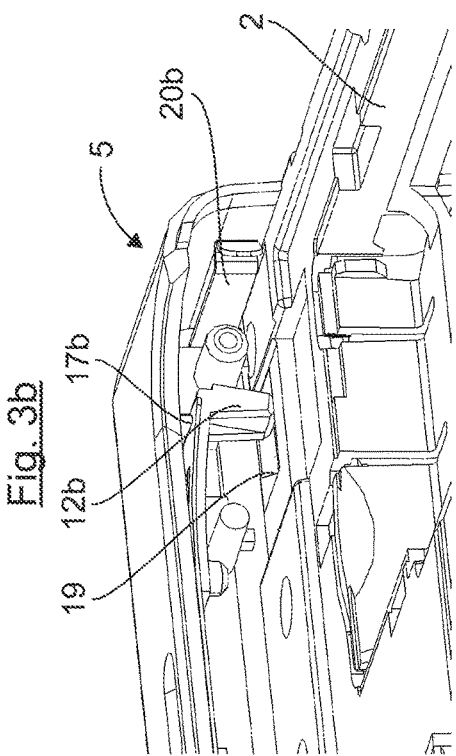
Fig. 3a
Fig. 4a
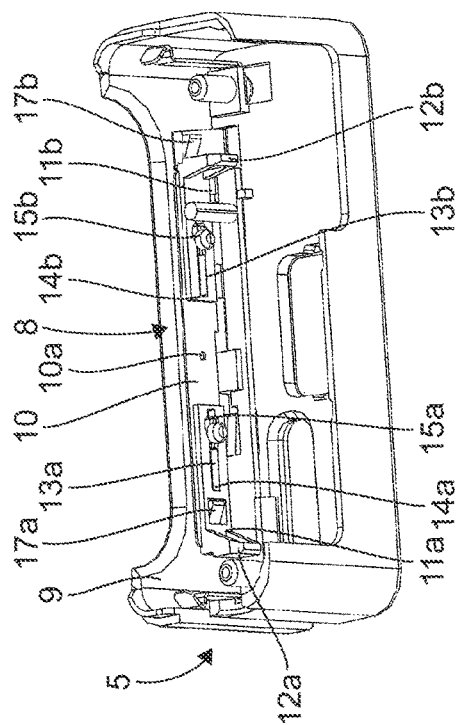
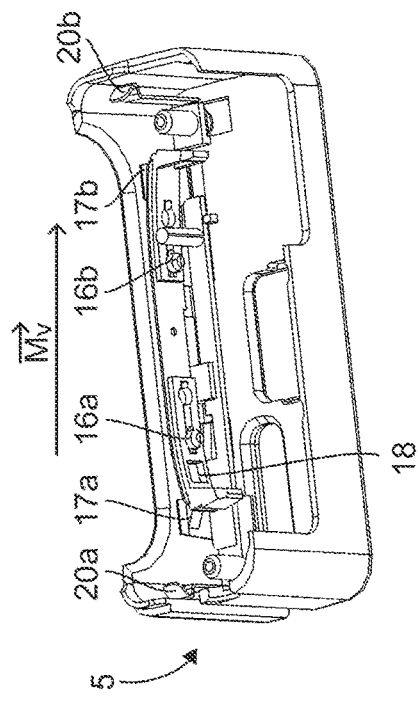
Fig. 3b
Fig. 4b

FLAP FOR PAYMENT DEVICE COMPRISING A PAYMENT TERMINAL AND A HOUSING FOR HOLDING A COMMUNICATION TERMINAL

CROSS-REFERENCE TO RELATED APPLICATIONS

This application is claims priority from and the benefit of French Patent Application No. FR 1461744, Filed Dec. 1, 2014, the content of which is incorporated herein by reference in its entirety.

FIELD

The disclosure relates to self-contained roaming payment devices that exchange data with one or more remote servers via one or more communication networks accessible for example from a communication terminal.

More precisely, the disclosure relates to a flap intended to equip such a payment device and to make it possible to hold a communication terminal in a dedicated housing.

PRIOR ART

Many people at work, such as taxi drivers or doctors, have to move about in the context of their daily work. These people have expressed the need to have mobile self-contained payment devices, enabling them in particular to invoice for the services provided during their work in a mobile situation. In response to this need, some payment devices use a communication network used by communication terminals. Such communication terminals are for example in the form of intelligent communication terminals (Smartphones) or digital tablets.

In some cases, the mobile payment device comprises in particular a payment terminal provided with a bankcard reader and a housing adapted to receive a communication terminal. This communication terminal thus enables the payment terminal to communicate with a remote server.

A flap is arranged facing the access to the housing of the communication terminal, so as to be adapted to block access and thus to provide secure fixing of the communication terminal to the payment terminal.

In known payment devices, this flap is mounted removably on the payment terminal, by means of fixing elements responding to a predefined operating force threshold. This threshold is in general defined so as to correspond to the average force supplied by a user during steps of assembling and disassembling the flap and the payment terminal. From a mechanical point of view, the removable character of the fixing lies in the use of connecting elements adapted to deform elastically so as to be able to pass from an assembly position to a disassembly position and vice versa.

In practice, such fixing elements are often subjected to frequently repeated stresses, which tends to weaken their structure and in the long term to cause rupture thereof. Where applicable, the fixing of the flap to the payment terminal is no longer assured in a satisfactory manner, and induces a noticeable reduction of the durability of this flap and, in general terms, of the whole of the payment device.

SUMMARY

An exemplary embodiment of the technique proposed does not have the drawbacks of the prior art. In at least one embodiment, the technique proposed relates to a flap for a payment device comprising a payment terminal and a housing for holding a communication terminal. This flap is characterised in that it comprises:
  a framework blocking access to said housing for holding a communication terminal,
  a locking device comprising at least:
  an actuation part,
  a locking part.
  Said actuation part and said locking part are respectively movable with respect to said framework between a locking position and an unlocking position.

The expression "payment terminal" as used in the description refers to an electronic device capable of reading the data on a bank card and performing a bank transaction. This payment terminal communicates for example via a "communication terminal" with a remote server. The term "locking" refers to a process by means of which the framework is fixed to the payment terminal so as to prevent disassembly of these two by a user. The expression "locking device" refers to an assembly formed by a single or a plurality of mechanical pieces, having a locking function. The term "part" refers to a fraction of this assembly—or in other words: a portion of a mechanical piece or a plurality of pieces included in this assembly—having a given function.

A flap according to an exemplary embodiment of the present disclosure has the advantage of being adapted to adopt a locking position in which this flap cannot be disconnected from the payment terminal without a user performing an unlocking action distinct from the disassembly process. The locking ability of the flap to the payment terminal is therefore not affected over time by the recurrence of the assembly and disassembly processes, which guarantees satisfactory reliability of the fixing of the flap to the payment terminal, both with regard to durability and with regard to the quality of the assembly.

According to a particular feature, said actuation part is adapted to move slidably with respect to said framework.

Such an actuation part can therefore advantageously be used in a flap having good compactness.

According to a particular feature, said actuation part and said locking part are adapted to move on paths not parallel to each other.

The term "path" as used in the description refers to the path followed by a part of the locking device when it moves, whether or not this path is rectilinear. This particular feature has the advantage of offering great freedom of design of the locking device, for the purpose of optimising the compactness of the flap.

According to a particular feature, said framework comprises an angular deviation part of a portion of said locking device.

The expression "angular deviation" refers to a part whose function is to move a portion of said locking device away from its initial path, at a given angle. This particular feature has the advantage of making the structure of the locking device less complex, the latter not necessarily being provided with an angular deviation mechanism.

According to a particular feature, said angular deviation part projects on an internal wall of said framework and comprises a bevelled portion intended to form a stop with a portion of said locking device.

Such an angular deviation mechanism has the advantage of being compact and non-complex.

According to a particular feature, said actuation part comprises an orifice intended to receive an actuation element of complementary shape.

The presence of such an orifice makes it possible to restrict the use of the locking device solely to users having an actuation element of complementary shape. This feature therefore confers additional security on the locking of the flap on the payment terminal.

According to a particular feature, said orifice has a shape complementary to the active portion of a SIM-card ejection tool.

According to a particular feature, said locking part comprises a locking lug intended to be inserted in a recess of complementary shape formed in said terminal.

This particular feature enables the use of a locking part that is non-complex and compact.

According to a particular feature, said locking device comprises a plurality of locking parts.

The use of at least two locking parts makes it possible to distribute the mechanical stresses related to the locking of the flap on the payment terminal, over a larger number of pieces. The locking parts are therefore less stressed individually, which confers a superior durability to the locking device.

According to a particular feature, said locking device comprises a single-piece mechanical piece comprising said actuation part and said locking part.

The term "single-piece" as used in the description describes an assembly formed by a single piece rather than a permanent or temporary assembly of mechanical pieces. Such a single piece can be manufactured according to industrial methods that are economical on a large scale and implemented at high rates, while having satisfactory resistance to the mechanical forces.

According to a particular feature, said locking device comprises:
  an actuating part comprising a central blade perforated at its centre, said central blade being mounted flush and sliding with an internal wall of said framework, and being visible around its central portion,
  two locking parts each comprising a hook secured to a longitudinal end of said central blade whose locking lug extends in a distal direction from said internal wall.

The term "visible" as used in the description describes a part visible from the outside of the framework. As a non-limitative example, such a part may be arranged so as to face an aperture formed in said framework. Such a locking device has the advantages of being compact, non-complex, ergonomic and economical.

According to a particular feature, said flap comprises a device for the autonomous removable fixing of said flap on said payment terminal.

The term "autonomous" as used in the description refers to a fixing implemented when the flap is arranged on the terminal, without any supplementary action by the user being necessary. Such a fixing is removable. A user can therefore put an end to it by applying a mechanical force in the direction of disassembly of the payment device. The use of such an autonomous removable fixing device makes it possible, during the assembly phase, to keep a suitable positioning of the flap on the payment terminal, for the time taken by a user to proceed with the locking of said flap. Once the payment device is assembled and locked, the removable fixing device works in concert with the locking device in order to absorb the mechanical forces exerted at the connection between the flap and the payment terminal. The removable fixing device and the locking device thus contribute respectively to the improvement of the durability of the other. In general terms, these two devices make it possible to obtain a fixing of superior reliability between the flap and the payment terminal.

According to a particular feature, said removable fixing device comprises a flexible curved blade intended to come into abutment with a part of said payment terminal.

Such a removable fixing device has the advantages of being compact, non-complex, ergonomic and economical.

The disclosure also relates to a payment device characterised in that it comprises a mobile payment terminal and said flap, said device being adapted to adopt at least two configurations:
  an assembly configuration in which said flap is arranged removably on said payment terminal and closes off access to a housing for holding a communication terminal,
  a locking configuration according to which said flap is locked on said payment terminal via said device for locking said flap.

FIGURES

Other features and advantages will emerge more clearly from a reading of the following description of a particular embodiment of the disclosure, given by way of simple illustrative and non-limitative example, and the accompanying drawings, among which:

FIG. 3a illustrates, in a perspective view, the inside of a flap in the unlocking configuration, according to a particular embodiment of the disclosure;

FIG. 3b illustrates, in a perspective view, the detail of a locking part of a flap arranged on a payment terminal in the unlocking configuration, according to a particular embodiment of the disclosure;

FIG. 4a illustrates, in a perspective view, the inside of a flap in the locking configuration, according to a particular embodiment of the disclosure;

FIG. 4b illustrates, in a perspective view, the detail of a locking part of a flap arranged on a payment terminal in the locking configuration, according to a particular embodiment of the disclosure;

DESCRIPTION

1. General Principle

The technique proposed relates to a flap intended to equip a mobile payment device. Such a payment device comprises in particular a payment terminal and a housing adapted to receive a communication terminal. This communication terminal thus enables the payment terminal to communicate with a remote server when a bank transaction is being conducted.

The flap is intended to be arranged so as to face the access to the communication terminal housing, so as to be adapted to block access thereto and thus to provide secure fixing of the communication terminal to the payment terminal. The flap comprises in particular a locking device adapted to tilt into a locking configuration, in which this flap cannot be disconnected from the payment terminal, without a user performing an unlocking action distinct from the disassembly process.

In general terms, an embodiment of the present disclosure thus relates to a flap that comprises:
- a framework blocking access to the housing holding the communication terminal; this framework being used to enclose the housing for insertion of the communication terminal;
- a locking device that comprises at least:
  - an actuating part,
  - a locking part.

The actuating part and the locking part are respectively movable with respect to the framework between a locking position and an unlocking position.

The locking device is compact and is for example in the form of a sliding deformable blade. In the locking position, the sliding blade is deformed: the ends of the sliding blade, which comprise locking lugs, are thus inserted in gripping zones provided for this purpose in the casing of the device. In the unlocking position, the sliding blade is flat: the ends of the sliding blade are free and the flap can be removed from the device in order to insert or withdraw the communication terminal. Moreover, the framework comprises means for sliding the blade: for example, an orifice for inserting a paperclip in the actuating part. Thus unlocking the flap is not too easy.

2. Description of a Particular Embodiment of the Disclosure

Figure 1:
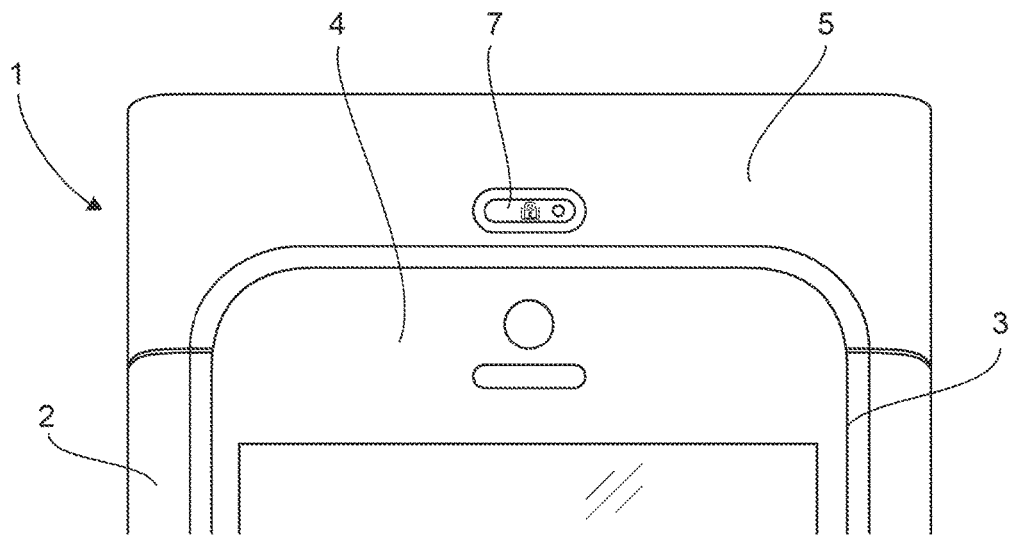
FIG. 1 illustrates, in a front view, the top part of a payment device according to a particular embodiment of the disclosure.

FIG. 1 illustrates the front face of the top part of a payment device (1) (the concepts of top part, bottom part, longitudinal direction, width, front face and rear face are here chosen arbitrarily for the requirements of the description). A payment terminal (2), having the general form of a right-angled parallelepiped casing produced for example from plastics material, comprises a bank-card reader, a man-machine interface for performing a transaction, for example a touch screen, and a housing provided longitudinally, that is to say over the length of the payment terminal (2). This housing has a rectangular opening at the top part of the payment terminal (2) and defines a holding housing (3) adapted to receive a communication terminal (4). This communication terminal (4) can therefore be inserted by sliding in the holding housing (3) until it comes into contact, in its working position, with the wall of the bottom of this holding housing (3).

Figure 2:
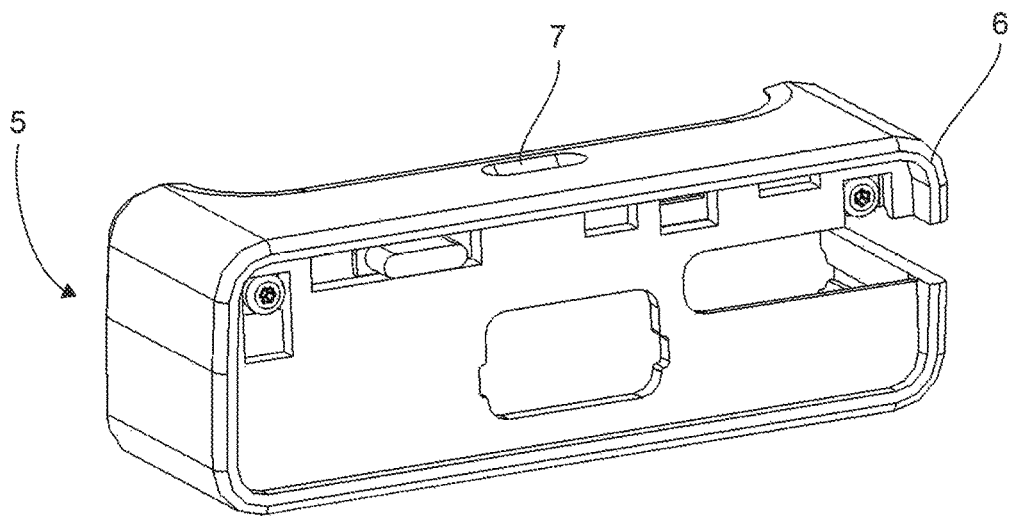
FIG. 2 illustrates, in a perspective view, the external wall of a flap according to a particular embodiment of the disclosure.

As illustrated by FIGS. 1 and 2, a flap (5), whose framework (6) has a form complementary to the top part of the payment terminal (2), is adapted to be arranged on the latter in order to close off access to the holding housing (3) in a secure matter. Thus, even in the case of impact, abrupt movement or dropping, the communication terminal (4) does not risk being disconnected from the payment device (1). The holding housing (3) provides protection of the communication terminal (4) against mechanical shocks. The framework (6) comprises an aperture (7) at the centre of its front face.

FIGS. 3a and 4a illustrate a locking device (8) arranged flush with the internal wall (9) of the front face of the framework (6), across the width of the latter. This locking device (8) comprises a blade (10) with a rectangular shape, having the function of actuating the locking device (8), as well as a first hook (11a) and a second hook (11b) each having a locking function and being respectively secured to each of the longitudinal ends of the blade (10). The locking lugs (12a, 12b) of each of these hooks (11a, 11b) extend in a distal direction from the wall (9). The hooks (11a, 11b) are fixed permanently to the blade (10), for example by adhesive bonding. According to other particular embodiments of the disclosure, the blade (10) and the hooks (11a, 11b) form a single piece, produced for example via an injection-moulding method. The locking device (8) comprises, at each zone where the blade (10) and one of the hooks (11a, 11b) overlap, an oblong hole (13a, 13b) that extends in the longitudinal direction of the blade (10) between a locking end (14a, 14b) and an unlocking end (15a, 15b). The framework (6) comprises two protuberances (16a, 16b) that form projections on the wall (9) and extend respectively through the oblong holes (13a, 13b).

The locking device (8) is thus mounted so as to be adapted to slide with respect to the wall (9) between an unlocking configuration illustrated by FIGS. 3a and 3b in which the protuberances (16a, 16b) are arranged at the unlocking ends (15a, 15b) of the oblong holes (13a, 13b), and a locking configuration illustrated by FIGS. 4a and 4b in which the protuberances (16a, 16b) are arranged at the locking ends (14a, 14b) of the oblong holes (13a, 13b).

The blade (10) is perforated close to its centre, so that the actuating orifice (10a) is continuously facing the aperture (7) in the framework (6), whatever the configuration adopted by the locking device (8). According to this particular embodiment, the form of the orifice (10a) is complementary to that of the active portion of a SIM-card ejection tool, such as for example the one provided by Apple®. AS a consequence, only a user having such a tool is in a position to engage on the orifice (10a) and thus actuate the locking device (8). According to another particular embodiment that is not illustrated, a protuberance projecting on the external wall of the framework through the aperture (7) can be substituted for the orifice (10a). A user is then in a position to directly actuate the locking device (8) via this protuberance without having to use a specific actuating tool. In another embodiment, a paperclip or any other rigid metal point whose diameter is less than or equal to the diameter of the actuating orifice (10a) is implemented instead of this SIM-card ejection tool.

The wall (9) comprises a first bevelled portion (17a) adapted to be housed in an opening (18) provided for this purpose in the body of the first hook (11a) when the locking device (8) is in an unlocking configuration, as illustrated by FIG. 3a. The bevel, that is to say the inclined face of the bevelled portion, is then opposite the first locking lug (12a). The wall (9) also comprises a second bevelled portion (17b), oriented in the same direction as the first, and arranged opposite the latter with respect to the aperture (7), at a distance substantially equal to the distance separating the first locking lug (12a) and the second locking lug (1b).

Thus, when the locking device (8) is moved from an unlocking configuration (illustrated by FIGS. 3a and 3b) towards a locking configuration (illustrated by FIGS. 4a and 4b), by sliding of the locking device with respect to the wall (9) and along a locking movement direction ($M_v$), the first locking lug (12a) and the second locking lug (12b) are brought into abutment with the respective bevels of the first bevelled portion (17a) and the second bevelled portion (17b). These two locking lugs (12a, 12b) are then diverted gradually from their initial path ($M_v$) in a distal direction transverse to the wall (9) in order to reach a maximum distal separation level when the locking device (8) is in the locking position. On the other hand, tilting the locking device (8) from its locking configuration to its unlocking configuration causes the disengagement of the locking lugs (12a, 12b) from the bevelled portions (17a, 17b) and the return of the whole locking device (8) flush with the wall (9).

In the case where the flap (5) is arranged on the payment terminal (2), the locking lugs (12a, 12b) of the hooks (11a, 11b) are inserted in recesses (19) provided for this purpose in the front face of the top part of the payment terminal (2), when the locking device passes into the locking configuration. The locking lugs (12a, 12b) then oppose any movement of the flap (5) in the longitudinal direction of the payment device (1). When the locking device (8) is in the locking configuration, the arrangement of the locking lugs (12a, 12b) inside their respective recesses (19) then prevents disassembly of the payment device (1).

Figure 5:
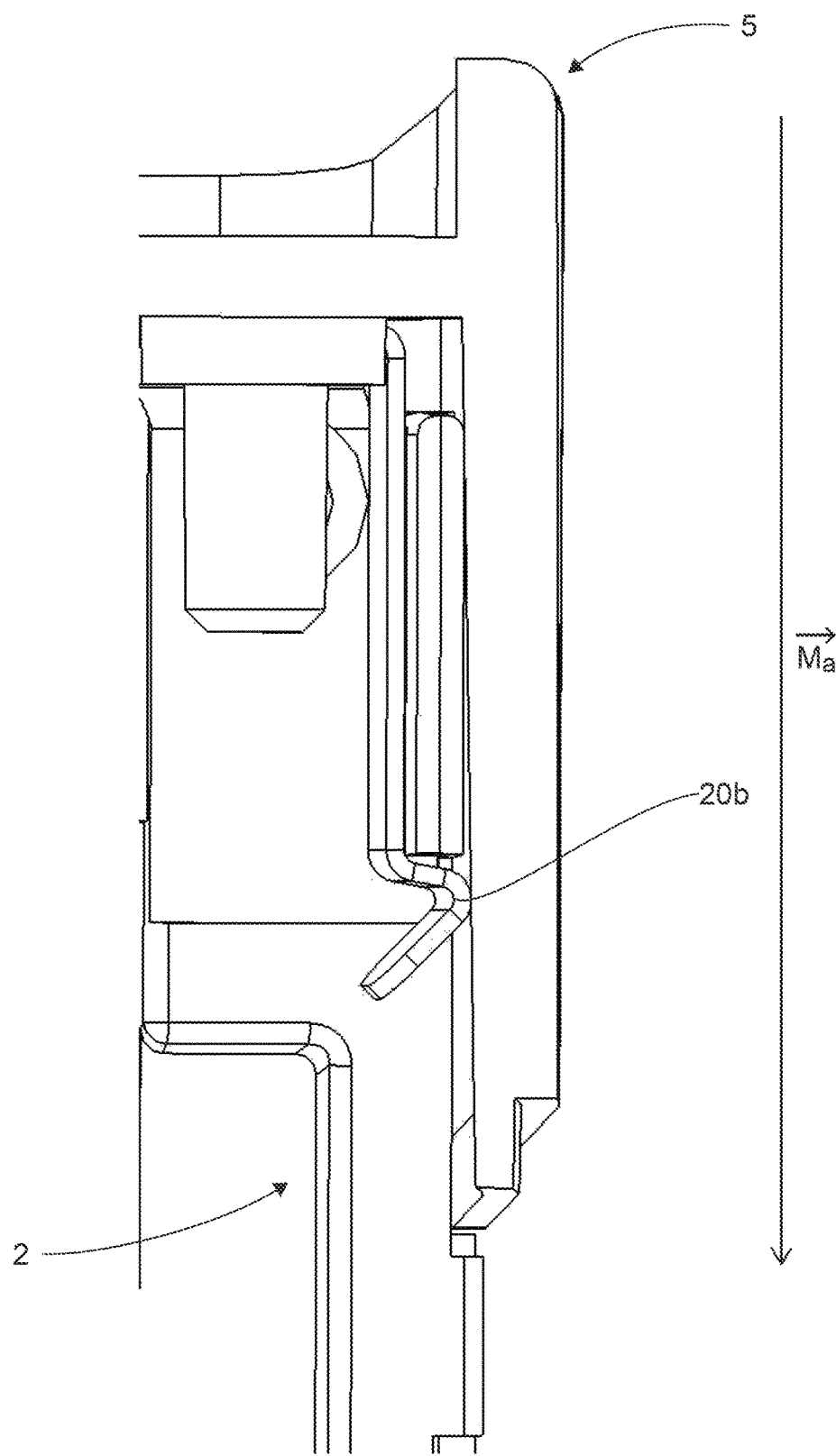
FIG. 5 illustrates, in a front cross-section view, a removable fixing device according to a particular embodiment of the disclosure.

As illustrated by FIG. 5, the flap (5) also comprises two flexible curved blades (20a, 20b) that extend in a longitudinal direction from the top part of the framework (6), close to the lateral walls of the latter. During the process of assembling the flap (5) and the payment terminal (2), these curved blades (20a, 20b) are brought into abutment with specific portions of the payment terminal (2), by an assembly movement ($M_a$). The reaction forces exerted on the curved blades (20a, 20b) then determine the assembly ability of the payment device (1). Thus, such an assembly is made possible only when the user applies an assembly force whose value exceeds a predefined threshold. In such case, the curved blades (20a, 20b) tilt towards an assembly position, by elastic deformation. The flap (5) is then arranged removably on the payment terminal (2). In order to proceed with the disassembly of the payment device (1), the user has to provide in a disassembly direction a force whose value exceeds a predefined threshold value. Such a disassembly direction is opposite to the direction of the movement ($M_a$). The respective force thresholds for the assembly and the disassembly of the payment device (1) are not necessarily equal to each other.

Although the present disclosure has been described with reference to one or more examples, workers skilled in the art will recognize that changes may be made in form and detail without departing from the scope of the disclosure and/or the appended claims.

The invention claimed is:

1. A flap for a payment device comprising a payment terminal and a housing for holding a communication terminal, the flap comprising:
   a framework comprising a first position relative to the housing in which the flap permits the communication terminal to be installed in the housing of the payment terminal, and a second position in which the flap blocks access to said housing, the framework of the flap being movable between the first and second positions, and
   a locking device on the framework, comprising at least:
      an actuating part,
      a locking part,
      said actuating part and said locking part being respectively movable with respect to said framework between a locking position and an unlocking position, wherein the locking part holds the flap in the second position when the actuating part is in the locked position.

2. The flap according to claim 1, wherein said actuating part is adapted to move slidably with respect to said framework.

3. The flap according to claim 1, wherein said actuating part and said locking part are adapted to move on paths not parallel to each other.

4. The flap according to claim 1, wherein said actuating part comprises an orifice configured to receive an actuating element of complementary shape.

5. The flap according to claim 1, wherein said locking part comprises a locking lug insertable in a recess of complementary shape formed in said payment terminal.

6. The flap according to claim 1, wherein said locking device comprises a plurality of locking parts.

7. The flap according to claim 1, wherein said locking device comprises a single-piece mechanical piece comprising said actuating part and said locking part.

8. A payment device comprising:
   a mobile payment terminal; and
   a housing for holding a communication terminal;
   a flap comprising:
      a framework comprising a first position relative to the housing in which the flap permits the communication terminal to be installed in the housing of the payment terminal, and a second position in which the flap blocks access to said housing, the framework being movable between the first and second positions, and
      a locking device comprising at least:
         an actuating part,
         a locking part, said actuating part and said locking part being respectively movable with respect to said framework between a locking position and an unlocking position, wherein the locking part locks the flap in the second position when the actuating part is in the locked position;
   said payment device being adapted to adopt at least two configurations:
   an assembly configuration, in which said flap is arranged removably on said payment terminal and closes off access to the housing, and
   a locking configuration in which said flap is locked on said payment terminal via said locking device of said flap.

9. A flap for a payment device comprising a payment terminal and a housing for holding a communication terminal, the flap comprising:
   a framework for blocking access to said housing for holding a communication terminal, and
   a locking device comprising at least:
      an actuating part,
      a locking part,
      said actuating part and said locking part being respectively movable with respect to said framework between a locking position and an unlocking position, and
      said framework comprises a part for angular deviation of a portion of said locking device.

10. The flap according to claim 9, wherein said angular deviation part forms a projection on an internal wall of said framework, and comprises a bevelled portion forming a stop with a portion of said locking device.

* * * * *